(No Model.)
J. N. BUCHANAN.
DEVICE FOR WELDING TUBES.
No. 354,626. Patented Dec. 21, 1886.
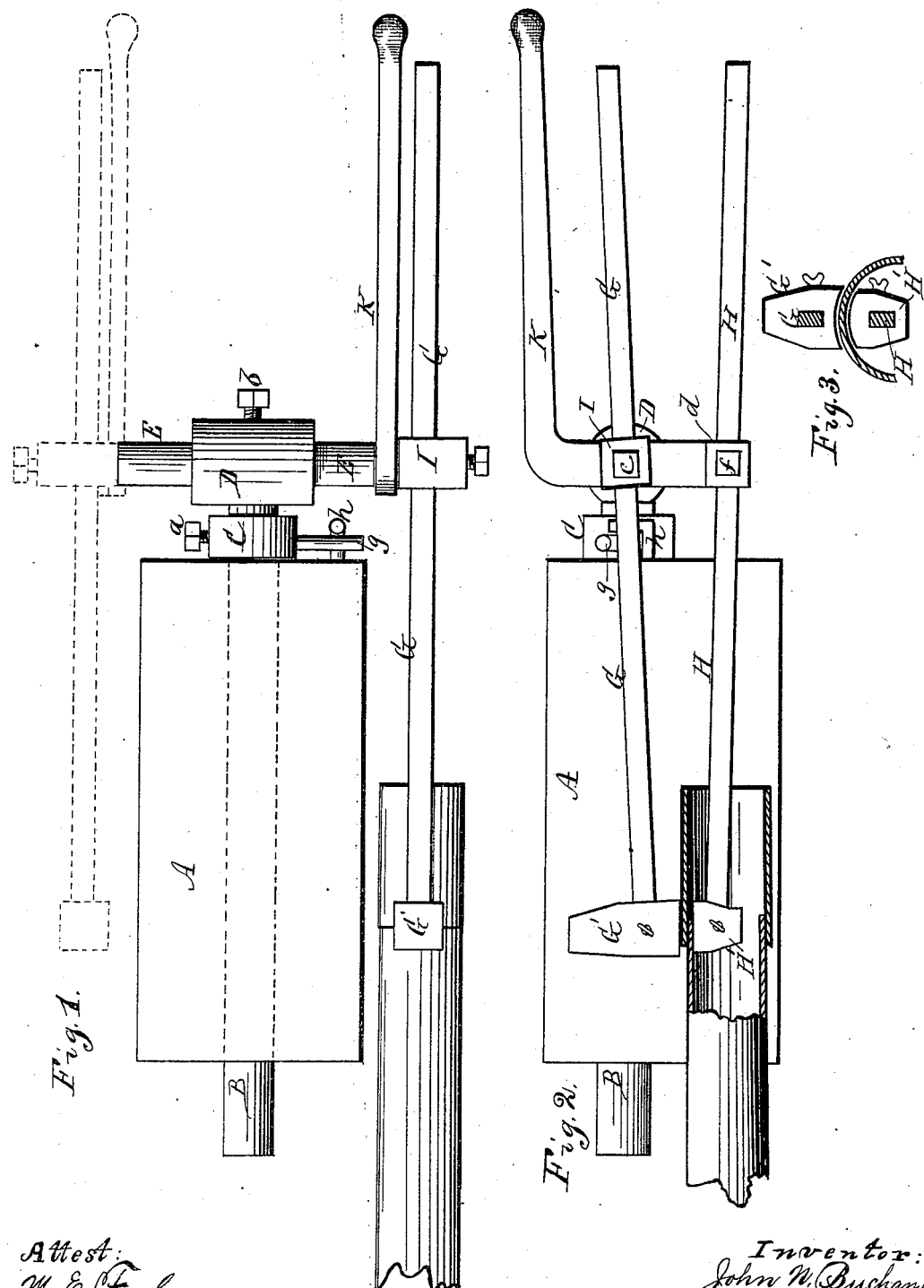
Attest:
M. E. Furlong.
C. Smith
Inventor:
John N. Buchanan,
By R. H. Osgood.
Atty.

UNITED STATES PATENT OFFICE.

JOHN N. BUCHANAN, OF BATAVIA, NEW YORK.

DEVICE FOR WELDING TUBES.

SPECIFICATION forming part of Letters Patent No. 354,626, dated December 21, 1886.

Application filed August 13, 1885. Serial No. 174,245. (No model.)

*To all whom it may concern:*

Be it known that I, JOHN N. BUCHANAN, of Batavia, in the county of Genesee and State of New York, have invented a certain new and useful Improvement in Apparatus for Welding Tubes and Flues; and I do hereby declare that the following is a full, clear, and exact description of the same, reference being had to the accompanying drawings, in which—

Figure 1 is a plan view of the apparatus. Fig. 2 is a side elevation. Fig. 3 is a diagram showing a cross-section of a flue and the devices for welding the same.

My improvement relates to apparatus for welding pipes and flues. Such work is usually done by hand, and the process is necessarily slow and tedious.

My improvement is as follows:

A indicates a solid block of iron forming a bearing, which is located by the side of the forge or the fire where the tube is heated.

B is a cylindrical shaft or spindle that passes longitudinally through a hole made in the block, and has free movement therein.

C is a collar fitted loosely on the shaft at one end of the block, but secured fast at any position by a set-screw, a.

D is a cross-head at the outer end of the shaft, made solid therewith or permanently attached thereto.

E is a cross-shaft that slides through the cross-head at right angles to the main shaft, and is secured at any position by means of a set-screw, b.

G H are two levers forming handles, and G' H' are two hammers attached thereto, by which the welding is done. The upper handle, G, slides loosely through a block, I, which is screwed on the end of the cross-shaft, and is secured at any position in said block by a set-screw, c. The lower lever, H, passes through a bearing, d, of a crank-shaped handle, K, and is secured by a set-screw, f. The handle K turns on the cross-shaft E and extends back horizontally above the levers G H, as shown in the side view, Fig. 2.

g is an arm projecting from the collar C and resting in an open hook, h, or some equivalent device attached to the block A. The hammers G' H' are removably attached to the ends of the levers by set-screws or other means, so that larger or smaller hammers can be applied at any time.

The operation is as follows: The fire is maintained at the side of the block A, and the tube to be welded is placed therein and heated. The upper hammer is placed outside the tube and the lower one inside, as shown. Pressure is applied to the handle K, which causes the lower hammer to bear with force against the interior of the tube and serve as an anvil. Blows are then struck on the upper hammer sufficient to produce the welding action, the tube being gradually turned in the fire as the work proceeds. The face of the upper hammer is made concave and that of the lower hammer convex to fit the circle of the tube.

Preparatory to welding the tube, as above described, the levers and other attachments are thrown over to the opposite side of the block A from the fire, as indicated by the dotted lines, Fig. 1, and the hammers are adjusted to the welding-lines of the tube by sliding the levers G H out or in and securing them properly in place, and the collar C is also adjusted on the shaft B. Then, when thrown back again to the fire, the hammers will come to the right position in welding in the fire.

By the means above described the work is greatly facilitated and much more rapidly done, and is accomplished all at one heat, which cannot be done by hand, as the flues are so thin that they become cooled before they can be got on the mandrel, and therefore require several heats. The lateral adjustment by means of the cross-shaft E in the head D enables the hammers to be brought to the center of the fire at all times.

Having described my invention, what I claim as new, and desire to secure by Letters Patent, is—

1. In an apparatus for welding tubes and flues, the combination of a fixed block or bearing, a shaft resting in the bearing capable of both a sliding and a turning movement, a cross-shaft at the end of the main shaft, and levers carrying hammers, one lever attached to the end of the cross-shaft and the other to the lower end of a cranked handle turning on the end of the cross-shaft, as shown and described, and for the purpose specified.

2. In an apparatus for welding tubes and flues, the combination of a fixed bearing, a shaft resting in the bearing capable of both a sliding and a turning movement, a cross-head attached to the shaft, a cross-shaft passing through the cross-head, a cranked handle turning on the cross-shaft, and two levers provided with hammers, one lever passing through a block attached to the cross-head, the other through a bearing of the cranked handle, as herein shown and described, and for the purpose specified.

3. The combination, in an apparatus for welding tubes and flues, of a fixed bearing, a shaft resting in the bearing, a collar fitting loosely on the shaft, secured by a set-screw and forming a gage, a cross head at the end of the shaft, a cross-shaft resting in the cross-head, a cranked handle jointed on the cross-shaft, and two levers provided with hammers, one sliding through a block attached to the cross-head, the other through a bearing of the cranked handle, as herein shown and described.

4. In an apparatus for welding tubes and flues, the combination of a bearing or block provided with a socket, a shaft turning loosely in the socket, a cross-shaft at the end of the main shaft, and two levers provided with hammers, attached one to the cross-shaft and the other to a handle on the cross-shaft, the whole arranged as described, so that the levers and hammers can be swung from one side to the other of the bearing or block, as and for the purpose specified.

In witness whereof I have hereunto signed my name in the presence of two subscribing witnesses.

JOHN N. BUCHANAN.

Witnesses:
A. J. McBRIDE,
J. F. GAGE.